United States Patent [19]

Sullivan et al.

[11] 3,966,667

[45] June 29, 1976

[54] PREPARATION OF NON-AQUEOUS THERMOSETTING ACRYLIC POLYMER DISPERSIONS

[75] Inventors: Thomas R. Sullivan, Natrona Heights; John W. Du, Natrona; Raymond L. Pelegrinelli, Cheswick; Suryya K. Das, Pittsburgh, all of Pa.

[73] Assignee: PPG Industries, Inc., Pittsburgh, Pa.

[22] Filed: Oct. 11, 1972

[21] Appl. No.: 296,705

[52] U.S. Cl.................. 260/33.6 UA; 260/31.2 R; 260/31.2 N; 260/31.4 R; 260/31.4 EP; 260/31.6; 260/32.4; 260/32.8 R; 260/32.8 N; 260/32.8 EP; 260/33.2 R; 260/33.2 EP; 260/33.4 R; 260/33.4 EP; 260/33.6 EP; 260/33.8 EP; 260/33.8 UA; 260/34.2

[51] Int. Cl.².................. C08J 3/08; C08K 5/01; C08K 5/02; C08K 5/04

[58] Field of Search.... 260/33.6 UA, 34.2, 33.6 EP, 260/31.4 EP, 31.2 R, 31.6, 33.8 UA, 33.4 EP, 33.2 R, 32.4

[56] References Cited
UNITED STATES PATENTS

| | | |
|---|---|---|
| 3,325,443 | 6/1967 | Christenson et al.............. 260/34.2 |
| 3,640,931 | 2/1972 | Clarke et al....................... 260/34.2 |
| 3,652,472 | 3/1972 | Clarke et al....................... 260/34.2 |
| 3,666,710 | 5/1972 | Makhlouf et al............ 260/33.6 UA |
| 3,686,111 | 8/1972 | Makhlouf et al............ 260/33.6 UA |
| 3,736,279 | 5/1973 | Camelon et al.................... 260/34.2 |
| 3,745,137 | 7/1973 | Reid et al.................... 260/33.6 UA |

FOREIGN PATENTS OR APPLICATIONS 967,051   8/1964   United Kingdom................ 260/34.2

*Primary Examiner*—Allan Lieberman
*Attorney, Agent, or Firm*—Carl T. Severini; George D. Morris

[57] ABSTRACT

A non-aqueous thermoset polymer solution coating having excellent properties is attained by polymerizing a hydroxy alkyl acrylate or methacrylate in a dispersing liquid in the presence of a dispersion stabilizer and a carboxylic acid and an imine. An aminoplast resin is added to the polymer dispersion after the dispersion is swamped with active solvent to form a solution and the resulting coating has excellent solvent pop resistance.

6 Claims, No Drawings

PREPARATION OF NON-AQUEOUS THERMOSETTING ACRYLIC POLYMER DISPERSIONS

There are many fields in which it is desirable to use acrylic polymer topcoats for purposes of protection and for aesthetic reasons. There are two general methods of preparing protective or decorative acrylic coatings, one of which is based on solution and the other on non-aqueous dispersion polymers. The first method which reaches back to the introduction of acrylic polymers into commercial use in coatings, is based on the traditional solution polymerization of acrylic monomers.

Two types of acrylic polymers have been widely used for both solutions and dispersions. The first is a thermoplastic non-crosslinking system that is applied as a lacquer. The second is a thermosetting acrylic dispersion which is a crosslinking system based on polymers with hydroxyl functionality cured with a melamine-formaldehyde resin. The solution polymer of either type is formulated according to methods well known in the art. The ingredients that are used in formulating a coating based on an acrylic solution polymer usually include pigments, fillers, plasticizers, flow aids, additional solvents and diluents and other materials which are collectively used to impart desired properties to the coating solution as well as to the coating film.

For reasons of economy it is important that the coating compositions can be applied rapidly and efficiently. In particular, with the constant striving for higher productivity in industry, methods of applying paint to yield a standard film thickness in two coats instead of three or more and which still produce a serviceable coating is clearly a desirable goal to those concerned with application of coatings in production.

As mentioned above, the second more recent method is based on non-aqueous dispersion polymers. The latter, which are now being introduced, are prepared by heating a mixture of acrylic monomers in the presence of a catalyst together with a dispersion stabilizer in organic solvents in which the polymer formed is substantially insoluble. The non-aqueous dispersion polymers, as produced according to the methods known in the art are desirable as they form easily pourable, essentially non-viscous liquids with substantially higher non-volatile contents than those in solution polymers.

The formulation of non-aqueous dispersion polymers into coatings is significantly different from formulations which are used for solution polymers. In order to retain the advantages of the non-aqueous dispersion technique throughout the preparation, storage, and application of the non-aqueous dispersion coatings, they are handled substantially as dispersions of particulate matter. Non-aqueous dispersion coatings in contrast to solution coatings, during their manufacture, storage, and application are formulated to take account of and retain the two phase nature of the dispersion polymer used. Solvent/diluent (non-solvent) ratios are selected with respect to evaporation rates which favor the enrichment of the percentage of solvent upon spray application of the coating because of more rapid evaporation of diluent. Finally, as the coating is subjected to baking temperatures common for industrial coating operations, the two phase dispersion polymer in the presence of active solvent is coalesced to form an integral coating film.

Obviously, the non-aqueous dispersions are not designed to be swamped with active solvents to then transform the dispersion to solution form as the advantages of the non-aqueous dispersions such as low viscosity, high solids and non-smog forming inexpensive diluents would be defeated thereby. Further, as one would expect the swamped dispersion to then have the same properties as a solution, it would be unwise to incur the added expense and consumption of time required to first form a non-aqueous dispersion.

A particular disadvantage of non-aqueous dispersions is that the presence of coalescence during storage may cause the dispersion to gel or otherwise damage the physical properties to such a degree as to render the material unusable.

One way to improve poor storage stability of non-aqueous dispersion coatings, and the method most often resorted to, is to precisely balance the composition of the active solvents and/or plasticizers present with the content of diluents (non-solvent). Some approaches to the stability problem of non-aqueous dispersion coatings include the use of more effective dispersion stabilizers in order to provide better protection to the polymer particles against dissolution and gelatin. This has not been entirely successful.

All of these previous approaches bring some relief to the problems encountered in formulating coatings from both solution and non-aqueous dispersion polymers. The growth of the organic coatings industry in recent years is one indication of the progress that has been achieved.

In the automotive industry, which is one of the important uses of acrylic coatings, the problems involving solution and non-aqueous dispersion coatings discussed above acquires specific urgency. Competitive pressure requires the original production finishing of automobiles to make the most effective use of labor and materials. Economizing production line space and capability of increasing speed of completing unit operations such as painting therefore become important. Topcoat finishing, for example, that can achieve the same protective film thickness and beauty with two spray applications when three or more are standard practice, is regarded as a valuable modification.

Prior to this invention, commercial thermosetting acrylic enamel topcoats required at least three spray applications, particularly when pigmentation contained metallic flake, to deposit films of requisite thickness and appearance. This invention concerns the solution of the above-mentioned problems and additionally realizes further advantages to be mentioned below.

The invention is primarily concerned with improvements in thermosetting acrylic enamels which are especially useful as automotive coatings. The improvements consist in excellent solvent pop resistance as well as in the ability to apply a satisfactory coating of two coats rather than three and high gloss and metallic flake pigment pattern control which results in an aesthetically pleasing appearance of the coating. The improvements are in large part associated with modifications of the paint binder by the imine and with the presence of a small portion of insoluble polymer particles called microgel.

It has now been found that non-aqueous solutions of thermosetting acrylic polymers comprising hydroxy alkyl acrylates or methacrylates, dispersion stabilizers, dispersing liquid and reaction products of imine and carboxylic acid may be prepared having excellent solvent pop resistance and exhibiting excellent pattern control when pigmented with metallics by first dispersion polymerizing the monomers and subsequently swamping the dispersion with active solvent to form a solution.

The process of forming a microgel containing solution in general is described in copending application Ser. No. 296,700, filed Oct. 11, 1972. This application describes the method utilized to achieve excellent gloss, pattern control and film build. The present invention is an improvement over that of the copending application in that the solvent pop resistance is unexpectedly enhanced by the addition of an imine and carboxylic acid to the polymer formed.

In general, the process for making non-aqueous dispersions of acrylic polymers in organic solvents is by dispersion polymerizing acrylic monomers in an organic liquid in which it is soluble, but in which the resulting polymer is insoluble and forms dispersed polymer particles. The reaction is carried out in the presence of a stabilizer having in its molecule (i) a constituent which becomes associated with the dispersed polymer particles, and (ii) a constituent having a pendant chainlike structure which is solvated by the organic liquid and provides a stabilizing shield around the polymer particles.

The acrylic monomers to be polymerized contain from about 4 to about 30 percent by weight of hydroxy containing compound. Examples of the hydroxy containing acrylic monomers are hydroxy alkyl acrylates and hydroxy alkyl methacrylates such as hydroxy ethyl acrylate, hydroxy propyl acrylate, hydroxy butyl acrylate, hydroxy hexyl acrylate, hydroxy octyl acrylate, hydroxy ethyl methacrylate, hydroxy propyl methacrylate, hydroxy butyl methacrylate, hydroxy hexyl methacrylate, hydroxy octyl methacrylate, and the like. The preferred hydroxy containing alkyl acrylates contain up to about 8 carbon atoms in the alkyl group.

The hydroxyl containing acrylic monomers may be copolymerized with other copolymerizable monomers to form the polymer dispersion as long as the final polymer contains at least about 4 percent by weight of the hydroxyl containing monomer. Examples of other monomers which may be copolymerized with the hydroxyl containing monomers are esters of carboxylic acids such as butyl acrylate, 2-ethyl hexyl acrylate, butyl methacrylate, octyl methacrylate, lauryl methacrylate, butyl hydrogen maleate and fumarate, and the like, may also be copolymerized with the hydroxyl containing monomers. Other copolymerizable monomers such as styrene, acrylonitrile, acrylamide, vinyl toluene, methacrylonitrile, methyl methacrylate, methyl acrylate, ethyl acrylate, butyl methacrylate, and the like may also be used.

The inclusion to the monomers to be polymerized of an ethylenically unsaturated carboxylic acid and an imine provides the solvent pop resistance and enhanced pattern control of the coating compositions. Thus the monomers to be polymerized must contain at least one ethylenically unsaturated carboxylic acid. The polymerizable ethylenically unsaturated carboxylic acid may be any acidic acrylic compound such as acrylic acid, methacrylic acid, crotonic acid, 3-butenoic acid, itaconic acid, and the like. This acid will react with the imine component.

The imine, in turn, may be any imine-containing compound which will react with the carboxylic acid.

Any imine-containing compound which will react with a carboxylic acid may be used. Generally, the imine-containing compounds are the alkylene imines and substituted alkylene imines. The preferred class of such imines are those of the formula;

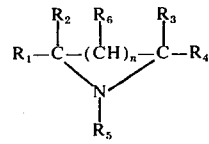

where $R_1$, $R_2$, $R_3$, $R_4$ and $R_5$ are each hydrogen; alkyl, such as methyl, ethyl, propyl, or the like, having, for example, up to about 20 carbon atoms; aryl, such as phenyl or the like; alkaryl, such as tolyl, xylyl or the like, or aralkyl, such as benzyl, phenethyl, or the like. $R_6$ in the above formula is hydrogen or a lower alkyl radical usually having not more than about 6 carbon atoms, and $n$ is an integer from 0 to 1.

It is intended that the groups designated by the above formula include substituted radicals of the classes indicated where the substituent groups do not adversely affect the basic nature of the imine in the reaction. Such substituents can include the groups such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkyl, and similar substituted derivatives of aryl, alkaryl and aralkyl groups where present.

It will be recognized by those skilled in the art that compounds containing certain combinations of the above groups cannot be obtained, for example, because of factors such as steric hindrance or intra-molecular interaction. For this reason, in most of the compounds of the class described, several of the groups designated by $R_1$ through $R_6$ represent hydrogen. However, the efficacy of the various alkyleneimine (whether or not within the above formula) does not depend upon the particular nature of any of the substituents, but rather the imine linkage; thus, beneficial results are obtained with interpolymers modified by any of those compounds within the above class.

A number of specific examples of alkyleneimines within the class described are as follows:
Ethylenimine (aziridine)
1,2-propyleneimine (2-methyl aziridine)
1,3-propyleneimine (azetidine)
1,2-dodecylenimine (2-decyl aziridine)
1,1-dimethyl ethylenimine (2,2-dimethyl aziridine)
Phenyl ethyleneimine (2-phenyl aziridine)
Tolyl ethylenimine (2-(4-methylphenyl)aziridine)
Benzyl ethylenimine (2-phenylmethyl aziridine)
1,2-diphenyl ethylenimine (2,3-diphenyl aziridine)
Hydroxyethyl ethylenimine (2-(2-hydroxyethyl)aziridine)
Aminoethyl ethylenimine (2-(2-aminoethyl)aziridine)
2-methyl propylenimine (2-methyl aziridine)
3-chloropropyl ethylenimine (2-(3-chloropropyl)aziridine)
p-chlorophenyl ethylenimine (2-(4-chlorophenyl)aziridine)
Methoxyethyl ethylenimine (2-(2-methoxyethyl)aziridine)
Dodecyl aziridinyl formate (dodecyl 1-aziridinyl carboxylate)

Carbethoxyethyl ethylenimine (2-(2-carbethoxyethyl)aziridine)
N-ethyl ethylenimine (1-ethyl aziridine)
N-butyl ethylenimine (1-butyl aziridine)
N-(2-aminoethyl)ethylenimine (1-(2-aminoethyl)aziridine)
N-(phenethyl)ethylenimine (1-(2-phenylethyl)aziridine)
N-(2-hydroxyethyl)ethylenimine (1-(2-hydroxyethyl)aziridine)
N-(cyanoethyl)ethylenimine (1-cyanoethyl aziridine)
N-phenyl ethylenimine (1-phenyl aziridine)
N-tolyl ethylenimine (1-(2-methylphenyl)aziridine)
N(p-chlorophenyl)ethylenimine (1-(4-chlorophenyl)aziridine)

Because of their availability and because they have been found to be among the most effective, the preferred imines are alkyleneimines and substituted alkyleneimines having 2 to 4 carbon atoms, and especially ethylenimine, 1,2-propylenimine, and N-hydroxyethyl ethylenimine.

The imine may be reacted with the acid either during the polymerization step or after the polymerization step. It may be preferable in some cases to carry out the reaction with imine concurrently with the interpolymerization reaction. In this embodiment, the imine is added to the polymerization mixture at any point prior to the completion of the polymerization reaction.

The mixture of monomers, acid, imine and dispersion stabilizer should generally contain from about 70 to about 98 percent by weight of the monomer, from about 0.5 to about 5 percent by weight of the carboxylic acid, from about 0.5 to about 5 percent by weight of the imine, and from about 1 to about 25 percent by weight of the dispersion stabilizer.

The ethylenically unsaturated monomer or monomers are polymerized in a dispersing liquid which solubilizes the monomers but in which the resulting polymers are not soluble and form dispersed polymer particles. The non-solvent (dispersing liquid) is generally a hydrocarbon medium consisting essentially of liquid aliphatic hydrocarbons. A pure aliphatic hydrocarbon or a mixture of two or more may be employed. To the extent that any particular polymer produced is insoluble in the hydrocarbon medium resulting, the essentially aliphatic hydrocarbon may be modified by the incorporation of other solvent materials such as aromatic or naphthenic hydrocarbons, and in certain instances the amount of such non-aliphatic component may attain as high as 49 percent by weight of the entire liquid medium. However, the liquid medium preferably consists essentially of aliphatic hydrocarbons and, in general, the compositions of the present invention contain less than 25 percent by weight based on the weight of the liquid medium of an aromatic hydrocarbon and often none at all.

It is essential that the hydrocarbon be of liquid character, but it may have a wide boiling range from a minimum of about 30°C. (in which case high pressures may be needed in the polymerization) to a maximum which may be as high as 300°C. For most purposes, the boiling point should be from about 50° up to about 235°C. The boiling point or boiling range of the liquid hydrocarbon system may be chosen as desired to be suitable for the particular operation in which the polymer dispersion prepared in the hydrocarbon is to be used. Thus, in coating or impregnating operations intended to be carried out in low temperature climates, a liquid hydrocarbon medium having a relatively low boiling point such as from about 30° to 35°C. may be preferred. A similar boiling point range may be selected for pressure systems, as in aerosol sprays. On the other hand, where the coating and impregnating operation is to be carried out in equipment provided with relatively high temperature drying ovens or rolls, the hydrocarbon system may have extremely high boiling points such as from 275° to 300°C.

Examples of non-solvents useful herein are pentane, hexane, heptane, octane mixtures of the same, and the like.

Ordinarily, the solution of monomers and non-solvent should contain from about 30 to about 80 percent by weight of the non-solvent. It is understood, however, that the monomeric solution need contain only that amount of non-solvent necessary to solubilize the monomers and maintain the resulting polymers in a dispersed state.

The monomers are polymerized in the presence of dispersion stabilizers.

The dispersion stabilizer used in this invention is a branched copolymer comprising two types of polymer components of which one segment is solvated by the aliphatic hydrocarbon solvent and not associated with polymerized particles of the polymerizable ethylenically unsaturated monomer and the second type is an anchor polymer of different polarity to the first type and being relatively non-solvatable by the aliphatic hydrocarbon solvent and capable of anchoring with the polymerized particles of the ethylenically unsaturated monomer, said anchor polymer containing pendant groups capable of copolymerizing with ethylenically unsaturated monomers.

The dispersion stabilizer comprises two segments. The first segment (A) comprises the reaction product of (1) a long-chain hydrocarbon molecule which is solvatable by the dispersing liquid and contains a terminal reactive group and (2) an ethylenically unsaturated compound which is copolymerizable with the ethylenically unsaturated monomer to be polymerized and which contains a functional group capable of reacting with the terminal reactive group of the long-chain hydrocarbon molecule (1).

Generally, the solvatable segment (A) is a monofunctional polymeric material of molecular weight of about 300 to about 3,000. These polymers may be made, for example, by condensation reaction producing a polyester or polyether. Preferably the polyester reaction is a simple one involving a monohydroxylic monocarboxylic monomer, such reactions leading to components which are strictly monofunctional with respect to one or the other group. The most convenient monomers to use are hydroxy acids or lactones which form hydroxy acid polymers. For example, a hydroxy fatty acid such as 12-hydroxystearic acid may be polymerized to form a non-polar component solvatable by such non-polar organic liquids as aliphatic and aromatic hydrocarbons. The polyhydroxy stearic acid may then be reacted with a compound which is copolymerizable with the acrylic monomer to be polymerized such as glycidyl acrylate or glycidyl methacrylate. The glycidyl group would react with the carboxyl groups of the polyhydroxy stearic acid and the polymer segment (A) would be formed.

Somewhat more complex, but still useful, polyesters may be made by reacting diacids with diols. For example, 1,12-dodecanediol may be reacted with sebacic acid or its diacid chloride to form a component solvatable by aliphatic hydrocarbons.

The preferred polymeric segment (A) of the dispersion stabilizer is formed by reacting poly-12-hydroxy stearic acid with glycidyl methacrylate.

The second polymeric segment (B) of the dispersion stabilizer is of different polarity to the first segment (A) and, as such, is relatively non-solvated by the dispersing liquid and is associated with or capable of anchoring onto the acrylic polymeric particles formed by the polymerization and contains a pendant group which is copolymerizable with the acrylic monomer. This anchor segment (B) provides around the polymerized particles a layer of the stabilizer. The solvated polymer segment (A) of which extends outwardly from the surface of the particles provides a solvated barrier which sterically stabilizes the polymerized particles in dispersed form.

The anchor segment (B) may comprise copolymers of (1) compounds which are readily associated with the acrylic monomer to be polymerized such as acrylic and methacrylic esters such as methyl acrylate, methyl methacrylate, ethyl acrylate, ethyl methacrylate, butyl acrylate, butyl methacrylate, 2-ethylhexyl acrylate, octyl methacrylate, and the like, with (2) compounds which contain groups copolymerizable with the acrylic monomer to be polymerized and which contain groups which are reactive with the polymeric segment (A), such as glycidyl-containing acrylates and methacrylates, such as glycidyl acrylate and glycidyl methacrylate. These copolymers are further reacted with polymerizable ethylenically unsaturated acids such as acrylic acid, methacrylic acid, 3-butenoic acid, crotonic acid, itaconic acid, and the like, which contain pendant groups which are copolymerizable with the acrylic monomer.

The preferred polymeric segment (B) is a terpolymer of methyl methacrylate, glycidyl methacrylate, and methacrylic acid.

The segments (A) and (B) are usually combined entities, the segment (A) being attached to the backbone of the graft copolymer and the segment (B) being carried in or on the backbone.

The polymerization may be carried out in a conventional manner, utilizing heat and/or catalysts and varying solvents and techniques. Generally, a free radical catalyst such as cumene hydroperoxide or similar peroxygen compound, or an azo compound is employed.

The resulting non-aqueous acrylic dispersion must contain at least about 0.5 percent by weight based on polymer solids of microgel particles dispersed therein. These microgel particles have substantially the same refractive index as that of the polymerized ethylenically unsaturated monomers and have particle sizes from about $1\mu$ to about $40\mu$. 61 The microgel particles are essentially insoluble in tetrahydrofuran and are substantially crosslinked.

It is noted that the presence of at least 0.5 percent by weight of microgel is critical to this invention. It has been found that the presence of the microgel particles offers a unique improvement over conventional solutions to be used as topcoats in that the film build (thickness of the film), gloss, efficiency of film deposition and pattern control with metallic pigments are substantially improved.

The compositions may also contain other ingredients such as plasticizers, fillers, pigments, and the like. This invention is particularly useful in the deposition of films containing metallic pigments such as aluminum, nickel, stainless steel, or the like, as the pattern control of the film is excellent.

Prior to the addition of aminoplast resin to the composition, active solvents for the acrylic non-aqueous dispersion polymer are added. Examples of active solvents are either aromatic hydrocarbons or oxygenated solvents such as esters, ketones, ethers, ether alcohols, and halogenated hydrocarbons. Examples of these active solvents are ethoxyethyl acetate (cellosolve acetate) 2,2,4-trimethyl 1,3-pentanediol monoisobutyrate, acetone, toluene, methyl ethyl ketone, methyl isobutyl ketone, diisobutyl ketone, methyl isoamyl ketone, diethyl ether, amyl acetate, butyl acetate, ethylene glycol diacetate, cyclohexanone, trichlorotrifluoroethane, trichloromonofluoromethane, 2-nitro propane, and the like.

The addition of the active solvent will bring the dispersion into essentially solution form. The bulk of the acrylic polymer will be essentially solvated while the microgel particles are insoluble in the solution. The ratio of the active solvents to dispersing liquid or non-active solvent should be from about 35:65 to about 90:10.

The polymer solution is mixed with an aminoplast resin to thermoset the polymer. The aminoplast resins used as crosslinkers for the polymer dispersion are aldehyde condensation products of melamine, urea, acetoguanamine, or a similar compound. They may be water-soluble or they may be organic solvent-soluble. Generally, the aldehyde employed is formaldehyde, although useful products can be made from other aldehydes, such as acetaldehyde, crotonaldehyde, acrolein, benzaldehyde, furfural, and others. Condensation products of melamine or urea are the most common and are preferred, but products of other amines and amides in which at least one amino group is present can also be employed.

For example, such condensation products can be produced from triazines, diazines, triazoles, guanidines, guanamines, and alkyl and aryl-substituted derivatives of such compounds, including alkyl-substituted, aryl-substituted and cyclic ureas, and alkyl and aryl-substituted melamines. Some examples of such compounds are N,N'-dimethyl urea, benzyl urea, N,N'-ethylene urea, diazine diamide, formaguanamine, benzoguanamine, ammeline, 2-chloro-4,6-diamino-1,3,5-triazine, 3,5-diaminotriazole, 4,6-diaminopyrrimidine, 2,4,6-triphenyltriamino-1,3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well known in the art, using acidic or basic catalysts and varying conditions of time and temperature. The aldehyde is often employed as a solution in water or alcohol, and the condensation, polymerization and etherification reactions may be carried out either sequentially or simultaneously.

The aminoplast resin should comprise from about 5 percent to about 50 percent by weight of the composition. The aminoplast may be merely added to the composition or, if desired, may be added at elevated temperatures such as 40°C. or higher.

The compositions are quite useful as coatings on substrates. The compositions are merely applied to the substrate and baked at 180° to 350°F. for about 5 to about 60 minutes to cure the coating on the substrate. The coatings may be applied by any conventional means such as spray coating, dip coating, roll coating, and the like. The preferred method is spray coating as the composition containing the imine modified acid can be applied easily with good film build.

Any substrate may be coated with the composition such as paper, metal, wood, paperboard, plastic, and the like. The preferred substrate is metal or primed metal such as found in automobile bodies.

The following examples set forth specific embodiments of the instant invention. However, the invention is not to be construed as being limited to these embodiments for there are, of course, numerous possible variations and modifications. All parts and percentages in the examples as well as throughout the specification are by weight unless otherwise indicated.

EXAMPLE 1

A flask was charged with 386.5 grams of heptane, 386.5 grams of hexane, 64.8 grams of methyl methacrylate, 4.6 grams of azobisisobutyronitrile, and 18.0 grams of a dispersion stabilizer comprising a 36.4 percent solids solution of 44 percent methyl methacrylate, 4.9 percent glycidyl methacrylate, 50.4 percent of the reaction product of 90.3 percent poly-12-hydroxystearic acid, and 9.7 percent glycidyl methacrylate, and 0.7 percent methacrylic acid, and heated to reflux at 77°C. After heating for 20 minutes the flask was charged with 146 grams of hydroxyethyl acrylate, 37.5 grams of methacrylic acid, 438 grams of styrene, 285 grams of butyl methacrylate, 193.2 grams of methyl methacrylate, 292 grams of ethylhexyl acrylate, 4.5 grams of octyl mercaptan, 10 grams of azobisisobutyronitrile, 11 grams of hydroxyethylethylene imine, and 423 grams of the dispersion stabilizer over a period of 3 hours. After an additional hour at 88.5°C 2 grams of azobisisobutyronitrile were added and for the next 2½ hours 2 grams of azobisisobutyronitrile were added every ½ hour. The composition was cooled and 150 grams of heptane and 150 grams of hexane were added. The dispersion had a solids content of 52.2 percent and an acid value of 6.06.

The resulting thermosetting acrylic polymer dispersion was formed into a coating by adding pigment pastes to 105.6 parts of the dispersion and 61.36 parts of a melamine-formaldehyde resin and adjusting the viscosity to 40 seconds measured by a No. 4 Ford cup with a mixture of active solvents and non-active solvents and further adjusting the viscosity to 17 seconds in a No. 4 Ford cup with the same mixture of solvents. The composition was sprayed onto an aluminum substrate and baked for 30 minutes at 250°F. and the film was tested for solvent pop resistance. The solvent pops which are caused by the volatilizing of solvent in the film during baking after the surface of the film has cured, resulting in craters and/or bubbles in the film were measured visually and the film prepared according to the method of Claim 1 was found to contain 0 to 1 pops per square inch of films.

This was compared to two films formed using the same technique with the exception that no imine was added in the polymerizable compositions. These films both were tested for solvent pop resistance and found to contain from 10 to 15 pops per square inch of film.

The above film was further compared to films prepared using the above compositions containing 2.3 grams of methacrylic acid and no imine and with the addition of ½ percent of the conventional solvent pop resistance agents triethyl amine and dimethyl dodecyl amine. The number of solvent pops per square inch of these films were 13 to 15 and 4 to 6, respectively.

It is thus seen that the method of the present invention results in superior solvent pop resistance with respect to the same films formed without imine addition and to the same film formed with conventional resistance agents.

EXAMPLE 2

A non-aqueous thermosetting acrylic polymer dispersion was prepared by heating 16.3 grams of methyl methacrylate, 27.3 grams of styrene, 17.7 grams of butyl methacrylate, 18.2 grams of 2-ethylhexyl acrylate, 9.1 grams of hydroxy ethyl acrylate, 1.6 grams of methacrylic acid, 0.7 gram of 2-hydroxyethylethylene imine, 0.12 gram of octyl mercaptan, and 9.1 grams of a dispersion stabilizer comprising a 36.4 percent solid solution of 44 percent methyl methacrylate, 4.9 percent glycidyl methacrylate, 50.4 percent of a reaction product of 90.3 percent poly-12-hydroxystearic acid and 9.7 percent glycidyl methacrylate, and 0.7 percent methacrylic acid in a solvent solution comprising 55 percent butyl acetate, 20 percent ethyl acetate, 4.5 percent toluene and 20.5 percent VM&P naphtha in a 50:50 solids solvent ratio wherein the solvent system is that system described in Example 1. The composition was heated at reflux until the acid value reached 6.70 and the viscosity was 3400 cps.

The resulting dispersion was formed into a coating by adding melamine-formaldehyde and reducing to a viscosity of 17 seconds as measured in a No. 4 Ford cup and spraying on an aluminum substrate and the film after baking at 250°F. for 30 minutes was found to contain only 0 to 3 pops per square inch.

The above was compared to a film formed in the same manner from the same composition except that 2.3 grams of methacrylic acid and no imine were used. The resulting film here had about 15 pops per square inch of film.

According to the provisions of the patent statutes, there is described above the invention and what are now considered to be its best embodiments. However, within the scope of the appended claims, it is to be understood that the invention can be practiced otherwise than as specifically described.

We claim:

1. A method of preparing a nonaqueous polymer composition comprising
   a. forming a polymer from reactants comprising
      1. about 70 to about 98 percent by weight of ethylenically unsaturated monomers, based on the weight of said reactants, wherein said ethylenically unsaturated monomers comprise
         a. from about 4 to about 30 percent by weight hydroxy-containing ethylenically unsaturated monomer, based on the weight of said reactants, and
         b. from about 0.5 to about 5 percent by weight ethylenically unsaturated carboxylic acid, based on the weight of said reactants, 2. from about 1 to about 25 percent by weight of a multifunctional dispersion stabilizer, based on the weight of said reactants,
3. from about 0.5 to about 5 percent by weight of an imine-containing compound which will react with said ethylenically unsaturated carboxylic acid, based on the weight of said reactants, in the presence of a dispersing liquid consisting essentially of liquid aliphatic hydrocarbons having a boiling point in the range of from about 30° to about 300°C. to form a nonaqueous dispersion of polymer and at least 0.5 percent by weight microgel particles, wherein 4. said multifunctional dispersion stabilizer is a branched copolymer containing two polymeric segments of which one segment is solvated by said dispersing liquid and said second segment is
  a. an anchor polymer of different polarity to said first segment,
  b. relatively nonsolvatable by said dispersion liquid, and
  c. contains pendant groups which are copolymerizable with said ethylenically unsaturated monomers, and
(5) said microgel particles
  a. being substantially crosslinked,
  b. being substantially insoluble in tetrahydrofuran,
  c. having substantially the same refractive index as that of said polymer, and
  d. being of size in the range of from about 1 to about 40 microns,
and b. adding active solvent to said nonaqueous dispersion to form a solution of said polymer containing dispersed microgel particles wherein the ratio of said active solvent to said dispersing liquid is in the range of from about 35:65 to about 90:10.

2. The method of claim 1 wherein said multifunctional dispersion stabilizer is formed by
a. graft polymerizing
  1. the reaction product of glycidyl methacrylate and poly(12-hydroxystearic acid),
  2. methyl methacrylate, and
  3. glycidyl methacrylate to form a copolymer product containing pendant epoxy groups; and
b. reacting said pendant epoxy groups with methacrylic acid.

3. The method of claim 1 wherein the imine is reacted with the carboxylic acid after the polymerization.

4. The method of claim 1 wherein the imine has the formula

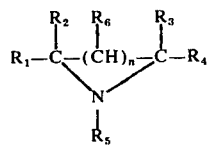

wherein $R_1$, $R_2$, $R_3$, $R_4$ and $R_5$ are each selected from the group consisting of hydrogen, alkyl, aryl, aralkyl, or alkaryl, $R_6$ is selected from the group consisting of hydrogen and lower alkyl radicals and $n$ is an integer from 0 to 1.

5. The method of claim 1 wherein an aminoplast resin is added after formation of said polymer to serve as a crosslinking agent for said polymer.

6. The method of claim 5 wherein the composition comprises from about 25 to about 75 percent by weight of the aminoplast resin.

* * * * *